United States Patent [19]
Krueger et al.

[11] 3,832,393
[45] Aug. 27, 1974

[54] PROCESS OF PRODUCING AMINO ALKYLENE PHOSPHONIC ACIDS

[75] Inventors: Friedrich Krueger, Edingen; Lieselotte Bauer, Bad Duerkheim, both of Germany

[73] Assignee: Joh. A. Benckiser GmbH, Ludwigshafen am Rhine, Germany

[22] Filed: Apr. 16, 1971

[21] Appl. No.: 134,873

[52] U.S. Cl............. 260/502.5, 210/58, 260/439 R, 260/937, 260/972
[51] Int. Cl........................ C07f 9/38, C02b 5/06
[58] Field of Search................. 260/502.5

[56] References Cited
UNITED STATES PATENTS

| | | | |
|---|---|---|---|
| 3,234,124 | 2/1966 | Irani................................ | 260/502.5 |
| 3,257,479 | 6/1966 | Irani et al. ........................ | 260/502.5 |
| 3,288,846 | 11/1966 | Irani et al. ........................ | 260/502.5 |

FOREIGN PATENTS OR APPLICATIONS

| | | | |
|---|---|---|---|
| 1,142,294 | 2/1969 | Great Britain................... | 260/502.5 |
| 1,125,977 | 9/1968 | Great Britain................... | 260/502.5 |

OTHER PUBLICATIONS

Wagner et al., "Synthetic Organic Chemistry," 1953, p. 567. QO262W24

Primary Examiner—Joseph E. Evans
Attorney, Agent, or Firm—Erich M. H. Radde

[57] ABSTRACT

Amino alkylene phosphonic acids such as ethylene diamine tetra-(methylene phosphonic acid), diethylene triamine penta-(methylene phosphonic acid), nitrilo tris-(methylene phosphonic acid), and others are obtained in a high yield by reacting alkylene glycol chlorophosphites with an aldehyde or ketone and an amine or an acid addition salt thereof or an acid amide of a lower mono- or dicarboxylic acid, such as formamide, oxamide, or urea. The resulting reaction solution can directly be added to fluid or solid cleaning agents or the substantially pure amino alkylene phosphonic acid can be recovered therefrom.

16 Claims, No Drawings

PROCESS OF PRODUCING AMINO ALKYLENE PHOSPHONIC ACIDS

BACKGROUND OF THE INVENTION

1. Field of the Invention

The present invention relates to a new and improved process of producing amino alkylene phosphonic acids.

2. Description of the Prior Art

Amino alkylene phosphonic acids are excellent complexing and sequestering agents for polyvalent metals, for instance, for calcium, magnesium, iron, and the like. They are resistant to hydrolysis and, therefore, have proved to be valuable additives to fluid or solid cleaning compositions. They are effective in sub-stoichiometric amounts, i.e. in so-called "threshold" amounts and, therefore, have become of increased importance during the last years.

A number of processes for producing amino alkylene phosphonic acids are known. For instance, German Published Application No. 1,214,229 describes the production of said acids by reacting an amine, formaldehyde, and phosphorous acid. However, a mixture of various compounds is formed during said reaction. To overcome this disadvantage it has been suggested, according to German Published Application No. 1,259,337, to use an excess of phosphorous acid. Thereby purer products are obtained.

British Pat. No. 1,142,294 describes a process according to which, in place of phosphorous acid, the less expensive phosphorous trichloride is reacted with the amine and formaldehyde to yield amino alkylene phosphonic acids. This process, however, has the disadvantage that thereby very vigorous reaction takes place and the temperature of the reaction solution is increased considerably. To avoid such vigorous reaction, the phosphorus trichloride must be added drop by drop and very slowly while well cooling the reaction mixture. However, due to the low boiling point of phosphorous trichloride it is often not possible to prevent part of the phosphorus trichloride to distill off or to be carried along by the hydrogen chloride gas which is developed and escapes in large amounts from the reaction mixture. The escaping phosphorus trichloride, of course, does not react with the amine and formaldehyde. As a result thereof, the yield of amino alkylene phosphonic acid is considerably reduced. In order to avoid this loss in yield, it is necessary to employ an excess of phosphorus trichloride.

It is also known to react phosphorous acid diester of lower monovalent alcohols with an amine and formaldehyde. Thereby, the esters of the amino alkylene phosphonic acids are obtained and not the free acids which can be obtained only by saponifying subsequently the initially formed esters to the acids. Such saponification, of course, is accompanied by a loss in yield. Furthermore, the preparation of the starting materials, the phosphorous acid diesters by reacting one mole of phosphorus trichloride with two moles of a monovalent alcohol has the disadvantage that mixtures of phosphorous acid di-esters and phosphorous acid ester chlorides which require subsequent purification, are formed thereby. Their purification, of course, is accompanied by considerable losses.

SUMMARY OF THE INVENTION

It is one object of the present invention to provide a simple and advantageous process of producing amino alkylene phosphonic acids at a high yield under reaction conditions which are highly economical, whereby the amino alkylene phosphonic acids are directly obtained in a substantially pure state.

Other objects of the present invention and advantageous features thereof will become apparent as the description proceeds.

In principle, the process according to the present invention consists in reacting glycol halogeno phosphites and preferably glycol chlorophosphites, i.e. the glycol esters of chloro phosphorous acid, with carbonyl compounds and especially with aldehydes or ketones, preferably with formaldehyde, and with ammonia or amines or their acid addition salts or with acid amides of lower mono- or dicarboxylic acids.

Replacing phosphorus trichloride in the known process of producing amino alkylene phosphonic acids by glycol chlorophosphites has the advantage that this reactant can be added much faster to the mixture of carbonyl compounds and amino or amido compounds because the glycol chlorophosphites have a considerably higher boiling point than phosphorus trichloride. As a result of said higher boiling point losses of glycol chlorophosphite by evaporation due to the increase in the temperature of the reaction mixture are avoided. For instance, ethylene glycol chlorophosphite boils at 71° C./50 mm. Hg while phosphorus trichloride has a boiling point of 74.5° C. at atmospheric pressure, i.e. it boils at about the same temperature as the chlorophosphite but at a much higher pressure. The process of the present invention thus is of special advantage when producing large amounts of amino alkylene phosphonic acids, because on such large scale production reaction conditions such as cooling and reaction time are of the greatest importance with respect to the economy of the process.

In the known process whereby phosphorous acid diesters of monovalent alcohols are reacted with amines and formaldehyde, the resulting amino alkylene phosphonic acid esters must be saponified subsequently to the free amino alkylene phosphonic acids. When using glycol chloro phosphorous acid esters as the one reactant, hydrogen chloride is formed during the reaction. This formation of hydrogen chloride has a favorable effect upon the reaction and, at the same time, causes saponification of the glycol esters of the resulting amino alkylene phosphonic acids. As a result thereof the free amino alkylene phosphonic acids are obtained immediately on reaction.

A further advantage of the process according to the present invention is that the starting chlorophosphorous acid esters with glycols and other polyvalent alcohols can be prepared in a simpler manner and in a purer state than the known phosphorous acid di-esters of mono-valent alcohols. Thus, on reacting one mole of phosphorus trichloride with two moles of a monovalent alcohol, there always are obtained mixtures of phosphorous acid diester and ester halogenides which, as stated above, must first be purified. In contrast thereto, the glycol chlorophosphorous acid esters are formed almost quantitatively on reacting one mole of phosphorus trichloride with one mole of glycol. It is, therefore, possible to use the resulting crude glycol chlorophosphorous acid ester without further purification directly in the reaction with an amine and formaldehyde to produce the desired amino alkylene phosphonic acids.

This simplifies the reaction considerably and represents a further advantage of the process of this invention over the known process.

Preferred glycol chlorophosphites which have proved to be especially useful in producing amino aklylene phosphonic acids according to the present invention are, for instance, 1,2-ethylene glycol chlorophosphite, 1,2-propylene glycol chlorophosphite, 1,3-butylene glycol chlorophosphite, and the like lower alkylene glycol chlorophosphites.

The glycol chlorophosphites are preferably obtained by reacting the corresponding glycol and phosphorus trichloride in the presence of methylene chloride as diluent. After distilling off the diluent on the water bath, the glycol chlorophosphite is purified by distillation in a vacuum.

It is also possible to produce the glycol chlorophosphites in the absence of a diluent and to use the resulting crude ester directly in the reaction with the carbonyl compounds and the amines according to the present invention. Thereby, the amino alkylene phosphonic acid can be obtained in a single operation by the addition of the carbonyl compound, such as the aldehyde or ketone to the crude ester and by subsequent addition drop by drop of the chlorohydrate of the respective amine or of the respective acid amide.

The glycol chlorophosphites can be reacted with all those mono- or polyamines or their acid addition salts as well as with all those aldehydes and ketones which have previously been used for the reaction of phosphorous acid or, respectively, phosphorus trichloride in the manufacture of amino alkylene phosphonic acids.

Especially high yields of amino alkylene phosphonic acids are obtained by reacting the glycol chlorophosphites with acid amides of lower mono- or dicarboxylic acids such as formamide, oxamide, or urea.

The reaction can be carried out by first neutralizing the respective amine with dilute hydrochloric acid in the reaction vessel, adding thereto the aldehyde and glycol chlorophosphite, and heating the mixture subsequently in the boiling water bath for 1 hour to 2 hours.

It is also possible to react the free amine, after mixing it, for instance, with a 37 percent formaldehyde solution with glycol chlorophosphite.

Furthermore, one may proceed in a different order of addition of the reactants, for instance, by first causing the glycol chlorophosphite to react with the aldehyde and then adding the amine or an acid addition salt thereof or an acid amide to the aldehyde-glycol chlorophosphite reaction mixture.

Of course, it is also possible to use mixtures of different amines in the reaction with the aldehydes or ketones and with glycol chlorophosphites.

The reaction product can be isolated by concentrating by evaporation the reaction solution and filtering off by suction the crystallized reaction product which is then washed with a small amount of water, alcohol, or acetone thus yielding the amino alkylene phosphonic acid as substantially pure compounds.

It is also possible to directly incorporate the crude reaction solution preferably of such amino alkylene phosphonic acids which crystallize with difficulty or which are obtained in the form of oils, into cleaning compositions in solid or liquid form or to add such crude reaction solutions to aqueous systems in order to prevent scale and deposit formation. The amounts of amino alkylene phosphonic acids added are sub-stoichiometric amounts. It was found that any unreacted glycol present in the crude reaction solution does not unfavorably effect the scale and deposit formation preventing activity of the amino alkylene phosphonic acids. On the contrary, the presence of glycol in compositions used for scale and deposit prevention has proved to be of considerable advantage.

DESCRIPTION OF THE PREFERRED EMBODIMENTS

The following examples serve to illustrate the present invention without, however, limiting the same thereto.

EXAMPLE 1

252 g. of ethylene glycol chlorophosphite (2 moles) are added to a mixture of 30 g. of ethylene diamine (½ mole), 100 g. of concentrated hydrochloric acid (1 mole), and 200 g. of an aqueous 30 percent formaldehyde solution (2 moles) within 30 minutes while stirring. Thereby, the temperature of the reaction solution increases to about 80° C. The reaction mixture is subsequently heated in the boiling water bath for two more hours and is then concentrated by evaporation in a vacuum. The precipitated ethylene diamine tetra-(methylene phosphonic acid) is filtered off by suction and washed with water and alcohol. It is obtained in the form of white crystals. The yield is 53 percent of the theoretical yield.

EXAMPLE 2

A mixture of 30 g. of ethylene diamine (½ mole), 100 g. of concentrated hydrochloric acid (1 mole), and 200 g. of an aqueous 30 percent formaldehyde solution (2 moles) is prepared while cooling. 280 g. of 1,2-propylene glycol chlorophosphite (2 moles) are added thereto drop by drop while stirring. The reaction mixture is heated at 110° C. for two more hours while stirring. The resulting reaction solution can be added without purification to cleaning compositions.

EXAMPLE 3

300 g. of an aqueous 30 percent formaldehyde solution (3 moles) are added to 378 g. of ethylene glycol chlorophosphite (crude, undistilled) (3 moles) within ten minutes while stirring. Thereby, the temperature of the reaction solution increases to about 60° C. Thereafter, 45 g. of formamide (1 mole) are added and the reaction solution is stirred in the boiling water bath for two more hours. On cooling, nitrilo tris-(methylene phosphonic acid) crystallizes. It is filtered off by suction and is washed with acetone. Yield: 83 percent of the theoretical yield.

In place of formamide used as the one reactant, there can be added equimolecular amounts of other acid amides, such as acetamide or ½ mole of oxamide or urea to the solution of ethylene glycol chlorophosphite and formaldehyde, while otherwise the procedure is the same as described in the above example.

EXAMPLE 4

500 g. of an aqueous 30 percent formaldehyde solution (5 moles) are added to 103 g. of diethylene triamine (1 mole) while stirring. Thereafter, 630 g. of ethylene glycol chlorophosphite (5 moles) are added to said mixture drop by drop. The temperature of the reaction solution increases thereby to 85° C. The reaction mixture is heated in the boiling water bath for 1 to 2 more hours. The resulting aqueous solution of diethylene triamine penta-(methylene phosphonic acid) can directly be added without further purification to cleaning compositions.

EXAMPLE 5

770 g. of 1,3-butylene glycol chlorophosphite (5 moles) are added drop by drop to a mixture of 103 g. of diethylene triamine (1 mole), 300 g. of concentrated hydrochloric acid (3 moles), and 500 g. of an aqueous 30 percent formaldehyde solution (5 moles). The reaction mixture is heated to 100°–110° C. for two more hours. The resulting aqueous solution can be added directly to cleaning compositions without further purification.

EXAMPLE 6

378 g. of ethylene glycol chlorophosphite (3 moles) are added drop by drop to a mixture of 53.5 g. of ammonium chloride (1 mole) and 300 g. of an aqueous 30 percent formaldehyde solution (3 moles) while stirring and cooling with water. Stirring of the reaction mixture in a boiling water bath is continued for 1 to 2 more hours. On cooling, nitrilo tris-(methylene phosphonic acid) crystallizes. It is filtered off by suction and washed with acetone. Yield: 71.4 percent of the theoretical yield.

EXAMPLE 7

434 g. (7 moles) of ethylene glycol are slowly added drop by drop to 1031 g. (7.5 moles) of phosphorus trichloride while cooling with water and stirring. Thereafter, stirring of the reaction mixture at room temperature is continued for 30 minutes. The resulting crude ethylene glycol chlorophosphite can be reacted without further purification with an amino compound and an aldehyde or ketone to yield the corresponding amino alkylene phosphonic acid.

For instance, 127 g. of said crude ethylene glycol chlorophosphite are added drop by drop to a mixture of 66 g. of an aqueous ethylene diamine hydrochloride solution containing 15 g. of ethylene diamine, and 100 g. of an aqueous 30 percent formaldehyde solution while cooling with water and stirring. Thereafter, stirring of the reaction mixture is continued in a boiling water bath for 1½ hours. On concentrating the resulting reaction solution by evaporation in a vacuum, ethylene diamine tetra-(methylene phosphonic acid) crystallizes. Yield: 60 percent of the theoretical yield.

In place of ethylene diamine and diethylene triamine as used in the preceding examples, there can be employed equimolecular amounts of 1,2- or 1,3-propylene diamine, dipropylene triamine, 1,2-diamino cyclohexane, 1-amino methyl-2-amino cyclopentane, 1,2-bis-(amino methyl) cyclobutane, 1,3-diamino-2-propanol, and other di- and polyamino compounds. On reaction with the glycol chlorophosphites and aldehydes or ketones as described in said examples there are obtained the corresponding 1,2- or 1,3-propylene diamine tetra-(methylene phosphonic acids), dipropylene triamine penta-(methylene phosphonic acid), 1,2-cyclohexyl diamine tetra-(methylene phosphonic acid), 1-amino methyl-2-amino cyclopentyl tetra-(methylene phosphonic acid), 1,2-bis-(amino methyl) cyclobutyl tetra-(methylene phosphonic acid), 1,3-diamino-2-propanol tetra-(methylene phosphonic acid), and the like di- and polyamine poly-(methylene phosphonic acids).

Preferably the concentration of the formaldehyde solution is between about 25 percent and about 40 percent, by weight. In place of aqueous formaldehyde solution there may also be employed formaldehyde-supplying compounds such as its trimer trioxane or its polymers such as paraformaldehyde although formaldehyde solution has proved to be preferred. In place of formaldehyde and formaldehyde yielding compounds, there can be used other aldehydes, such as acetaldehyde, propionaldehyde, butyraldehyde, isobutyraldehyde, and others, or ketones such as acetone and others, whereby the procedure is the same as described hereinabove in the preceding examples.

In place of the glycol chlorophosphites used according to the present invention, there can also be employed other glycol halogenophosphites as they are obtained by reacting one mole of phosphorus halogenide, for instance, phosphorus tribromide or phosphorus triiodide, with one mole of the glycol, although phosphorus trichloride is the preferred reactant.

As shown in the preceding examples the glycol halogeno phosphites are preferably added while cooling the reaction mixture because thereby the phosphite can be added rather rapidly without the danger that the reaction will proceed too vigorously. It is, of course, also possible to add the glycol halogenophosphites without cooling whereby, however, the reaction mixture must be well stirred and the phosphite must be added more slowly. Thereby the reaction temperature may even be as high as 150° C.

We claim:

1. In a process of producing an amino alkylene phosphonic acid which comprises heating in an aqueous medium a phosphorus compound with an aliphatic carbonyl compound selected from the group consisting of an aliphatic aldehyde and an aliphatic ketone, and with a compound selected from the group consisting of ammonia, a primary or secondary amine, an acid addition salt of ammonia, and an acid addition salt of said amine, at a temperature between room temperature and 150°C., until the corresponding amino alkylene phosphonic acid is formed and crystallized from the reaction mixture, and separating the crystallized product from the reaction mixture, the improvement which comprises said phosphorus compound being a cyclic alkylene glycol halogenophosphite.

2. The process of claim 1, in which the alkylene glycol halogenophosphite is ethylene glycol chlorophosphite.

3. The process of claim 1, in which the alkylene glycol halogenophosphite is 1,2-propylene glycol chlorophosphite.

4. The process of claim 1, in which the alkylene glycol halogenophosphite is 1,3-butylene glycol chlorophosphite.

5. The process of claim 1, in which the carbonyl compound is an aqueous formaldehyde solution.

6. The process of claim 1, in which the amine is ethylene diamine.

7. The process of claim 1, in which the amine is diethylene triamine.

8. The process of claim 1, in which the ammonium salt is ammonium chloride.

9. The process of claim 1, in which the alkylene glycol chlorophosphite is added drop by drop to a mixture of the acid addition salt of the amine and an aqueous formaldehyde solution, whereupon the temperature of the reaction solution is increased to at least the temperature of the boiling water bath and heating is continued until the reaction is completed.

10. The process of claim 1, in which the alkylene glycol halogenophosphite is a lower alkylene glycol chlorophosphite, the lower alkylene glycol moiety in said lower alkylene glycol chlorophosphite having two to four carbon atoms, the amino compound is ethylene diamine, and the carbonyl compound is formaldehyde, and in which the reaction yields ethylene diamine tetra-(methylene phosphonic acid).

11. The process of claim 1, in which the alkylene glycol halogenophosphite is a lower alkylene glycol chlorophosphite, the lower alkylene glycol moiety in said lower alkylene glycol chlorophosphite having two to four carbon atoms, the amino compound is diethylene triamine, and the carbonyl compound is formaldehyde, and in which the reaction yields diethylene triamine penta-(methylene phosphonic acid).

12. The process of claim 1, in which the alkylene glycol halogenophosphite is a lower alkylene glycol chlorophosphite, the lower alkylene glycol moiety in said lower alkylene glycol chlorophosphite having two to four carbon atoms, the amino compound is ammonium chloride, and the carbonyl compound is formaldehyde, and in which the reaction yields nitrilo tris-(methylene phosphonic acid).

13. In a process of producing an amino alkylene phosphonic acid which comprises heating in an aqueous medium a phosphorus compound with an aliphatic carbonyl compound selected from the group consisting of an aliphatic aldehyde and an aliphatic ketone, and with a nitrogen-containing compound at a temperature between room temperature and 150°C. until the corresponding amino alkylene phosphonic acid is formed and crystallized from the reaction mixture, and separating the crystallized product from the reaction mixture, the improvement which comprises said phosphorus compound being a cyclic alkylene glycol halogenophosphite and said nitrogen-containing compound being an acid amide of a lower mono- or di-carboxylic acid.

14. The process of claim 13, in which the acid amide is formamide.

15. The process of claim 13, in which the aqueous solution of formaldehyde is added to the alkylene glycol chlorophosphite while stirring, whereafter the acid amide is added and the reaction mixture is heated at least to the temperature of the boiling water bath until the reaction is completed.

16. The process of claim 13, in which the alkylene glycol halogenophosphite is a lower alkylene glycol chlorophosphite, the lower alkylene glycol moiety in said lower alkylene glycol chlorophosphite having two to four carbon atoms, the amino compound is formamide, and the carbonyl compound is formaldehyde, and in which the reaction yields nitrilo tris-(methylene phosphonic acid).

* * * * *